Patented Jan. 30, 1940

2,188,885

UNITED STATES PATENT OFFICE 2,188,885

CONDENSATION PRODUCT AND METHOD

Edwin T. Clocker, Bethlehem, Pa.

No Drawing. Application September 27, 1937,
Serial No. 165,898

25 Claims. (Cl. 260—410)

My invention relates to methods of producing an improved condensation product suitable for use in resins, lacquers, paints, varnishes, enamels, plastic masses, dispersing, wetting and softening agents, and for other similar purposes, and to the new product so produced. My invention also relates to the new methods of dispersing and the like.

This application is a continuation in part of my copending application, Serial No. 759,086, filed December 24, 1934, and Serial No. 117,243, filed December 22, 1936, both for Condensation product and method. Serial No. 759,086 includes the generic claims and certain species relating to the condensation of an acyclic olefinic acid having less than ten carbon atoms in the carbon chain or its ester, with a nonconjugated unsaturated nonhydroxylated aliphatic acid having from ten to twenty-four carbon atoms in the carbon chain, or a salt or ester thereof. Serial No. 117,243 relates particularly to the maleic species. Serial No. 165,899 filed September 27, 1937, for Condensation product and method, includes the subject matter relating to re-condensation. Serial No. 165,900 filed September 27, 1937, for Coating product and method, is concerned particularly with coating. Serial No. 231,759, filed September 26, 1938, for Condensation product and method, is directed to the reaction product of the condensation product with a basic dyestuff. Serial No. 231,760, filed September 26, 1938, for Condensation product and method, is directed to water insoluble metallic salts. Serial No. 231,761, filed September 26, 1938, for Oily dispersion material, relates to oils, fats and waxes emulsified by the condensation product of the invention. Serial No. 235,252, filed October 15, 1938, for Condensation product and method, is directed to condensation with oleic acids and its compounds.

A purpose of my invention is to produce salts or esters of an improved condensation product resulting from condensation between an acyclic olefinic acid having less than ten carbon atoms in its carbon chain and one of the group consisting of nonconjugated unsaturated nonhydroxylated aliphatic acids having from ten to twenty-four carbon atoms in their carbon chains, nonhydroxylated salts thereof and nonhydroxylated esters thereof or similar compounds, as explained below. Any relatively short chain compound containing the ethylene linkage in condensable form may be condensed with any nonconjugated unsaturated nonhydroxylated aliphatic acid or the like having from ten to twenty-four carbon atoms in its carbon chain.

A further purpose is to produce salts and esters of condensation products formed by condensation of a condensable ethylene type acidic compound having less than ten carbon atoms in its carbon chain at the carbon chain of a nonconjugated unsaturated nonhydroxylated fatty acid or the like by suitable application of heat and, desirably, also pressure. A temperature between 150° C. and 300° C. or higher is preferred for the reaction, 180° C. to 260° C. being the most satisfactory range. Very good results are obtained using temperatures of at least 150° C. and in excess of the ordinary boiling point of the acyclic olefinic acid with return condensation.

A further purpose is to cause the condensation to take place between one molecular equivalent of condensable ethylene type acidic compound having less than ten carbon atoms in its carbon chain and one molecular equivalent of nonconjugated unsaturated nonhydroxylated carbon chain compound having from ten to twenty-four atoms in the chain.

A further purpose is to produce a salt or ester of an acyclic olefinic acid or the like having less than ten carbon atoms in its carbon chain, partially or completely saturating the double bonds of a nonconjugated unsaturated nonhydroxylated fatty acid, fatty oil or the like.

A further purpose is to condense maleic anhydride or the like with a drying oil such as linseed oil and to change the condensation product into a salt or ester.

A further purpose is to produce my novel condensation product in a form which has a polar-reactive group.

A further purpose is to cause the acid group of a condensation product of an acyclic olefinic acid or acid anhydride having less than ten carbon atoms in its carbon chain with a nonconjugated unsaturated nonhydroxylated fatty acid or the like having from ten to twenty-four carton atoms in its carbon chain, to react with other compounds, such as metal salts or metals.

A further purpose is to produce an improved water-soluble compound for use in emulsifying oils by forming a completed salt, acid salt or salt-ester of the condensation product of an acyclic olefinic acid having less than ten carbon atoms in the carbon chain and a nonconjugated unsaturated nonhydroxylated aliphatic acid having from ten to twenty-four carbon atoms in its carbon chain, or similar compound.

A further purpose is to employ the salt, acid salt or salt-ester of the condensation product of an acyclic olefinic acid having less than ten carbon atoms in the carbon chain, and a nonconjugated unsaturated nonhydroxylated aliphatic compound having from ten to twenty-four carbon atoms in its carbon chain, as a wetting or softening agent in the textile, leather, paper, printing ink and rubber industries, or as a bodying agent in the polishing, cutting and cosmetic industries, desirably mixing the condensation product with other oils and dispersing the mixture of the condensation product and other oils.

A further purpose is to disperse a paint, varnish or lacquer vehicle and desirably, also, a paint, varnish or lacquer resin in water or a similar medium for coating or the like by means of a soluble salt of the condensation product of maleic anhydride or the like and a nonconjugated unsaturated nonhydroxylated fatty oil or the like.

A further purpose is to employ a salt of the condensation product of the present invention for detergent purposes independent of or incidental to its utility as a paint.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and acids and similar compounds having from ten to twenty-four carbon atoms in the carbon chain and the condensation product thus obtained may be formed into salts and/or esters of desirable properties.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1923) pages 250-256). Instead of maleic anhydride, an acid ester of maleic acid, or a substituted maleic acid having less than ten carbon atoms in its carbon chain may be used.

As explained herein, in order to avoid a mere esterification of alcohol groups in the initial reaction, as distinguished from a condensation at the double bond, the oil or similar compound should be non-hydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability of avoiding refluxing of course ceases.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa. Wherever I refer to an ester, I include also a half ester.

Investigation of a large number of compounds has shown that condensation with a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form acids or acid anhydrides, or half esters thereof, or similar compounds. These compounds are olefinic as they are acyclic and have the ethylene linkage. Such olefinic compounds are mono-substituted when they contain only one acid, acid anhydride or esterified group; for example, crotonic acid. Such olefinic compounds are di-substituted when they contain two acid, acid anhydride or esterified groups; for example maleic anhydride, citraconic anhydride, maleic acid, acid methyl maleate.

When an olefinic compound of less than ten carbon atoms in the carbon chain, is said to have the ethylene linkage in condensable form, the expression "in condensable form" is intended to indicate that the compound is not a hydrocarbon, for example, but that it is an acid or acid anhydride, or half ester thereof, or a similar compound which will condense with a nonconjugated unsaturated nonhydroxylated fatty acid or the like having from ten to twenty-four carbon atoms in the carbon chain.

The longer the carbon chain of the acrylic olefinic acid or acid anhydride, or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of any ester of any olefinic compound, the carbon chain of the olefinic compound should have less than ten carbon atoms, the carbon chain of the compound added by esterification not being counted.

In all cases where I refer in the specification to less than ten carbon atoms in the carbon chain of the acyclic olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

It will of course be apparent that an attempt to condense maleic anhydride or the like with a nonconjugated unsaturated hydroxylated aliphatic acid having from ten to twenty-four carbon atoms in the carbon chain, or a salt or ester thereof, will result in esterification between the acidic group of maleic anhydride and the hydroxyl group or groups in the aliphatic acid, salt or ester. Condensation between the maleic anhydride or the like and the carbon chain of the hydroxylated aliphatic acid, salt, or ester, will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a non-hydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have been generally been drawn to exclude hydroxylated aliphatic acids, salts and esters. This means that such acids, salts and esters are not sufficiently hydroxylated to interfere with the condensation by esterification. Oils which are polymerized by blowing with air are usually hydroxylated.

In those cases where the claims do not exclude hydroxylated aliphatic acids, salts and esters, it will be understood that more than mere esterification is intended—there should be condensation at a point of unsaturation on the carbon chain of the acid, salt or ester.

When reference is made to the maleic grouping in condensable form, it will be understood that it is intended to designate maleic anhydride, a substance yielding maleic anhydride or a similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound havving the maleic grouping, preferably maleic anhydride.

As will be later explained in considerable detail, the presence of the acid or acid anhydride radical in the condensation product is distinctly advantageous, because of the reactions of which the acid or acid anhydride radical is capable and the uses to which such reactions may be put.

A wide variety of non-conjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acids may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I may use, I suggest oleic, linoleic, linolenic, clupanodonic and undecylenic. The esters of the nonhydroxylated fatty acids may be either glyceryl esters, which form oils such as corn, olive, cotton seed, peanut, linseed, sunflower, safflower perilla, hemp seed, walnut seed, soya bean, rape seed, tomato seed, neat's foot, lard, codliver, cod, burbet, salmon, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, may be employed if desired.

When I refer to the grouping of a nonconjugated unsaturated nonhydroxylated aliphatic acid having from ten to twenty-four carbon atoms in the carbon chain, I mean to include the acid, and compounds of the acid such as esters of the acid, whether with mono-, di- or poly-hydric-alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. Typical hydroxylated fatty oils are castor oil and cashew nut shell oil. The question of whether the free acid or the ester or the salt is used is immaterial from the standpoint of the condensation reaction because the condensation reaction with the maleic anhydride appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I may desirably employ one molecular equivalent of nonconjugated unsaturated nonhydroxylated aliphatic acid or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature may in some cases be somewhat above 300° C. if the reacting components can stand such high temperature. Pressure may desirably be applied by simply confining the reaction components between the walls of some vessel such as a pressure autoclave and then heating the reaction components. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

When I refer herein to reaction under return condensation I mean to include not only reaction in the confining walls of a pressure autoclave as in Example 1 but also under reflux as in Example 3.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient acyclic olefinic acid having less than ten carbon atoms in the carbon chain, to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it may be desirable to saturate more ethylene linkages in the fatty acid or fatty oil, and even to completely saturate them. To saturate all of the ethylene linkages in linseed oil, six molecular equivalents of olefinic compound having less than ten carbon atoms in the carbon chain are caused to react with one molecular equivalent of linseed oil.

Examples 1 to 5 given below, clearly indicate the way in which my improved condensation product is obtained:

Example 1

In a pressure autoclave, 180 parts by weight of raw alkali-refined linseed oil are mixed with 20 parts by weight of maleic anhydride. The temperature is maintained at from 230° C. to 260° C. for one hour, a pressure of about 30 pounds per square inch developing. The reaction may be obtained satisfactorily at 150° C., but is much slower at this low temperature, and the temperature may be raised to as much as 300° C., or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

Example 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed by the reflux condenser progressively diminishes. The temperature is maintained at 250° C. to 260° C. until no more maleic anhydride appears to condense under the reflux. The temperatures given are those found best for carrying out the reaction, although temperatures between 150° C. and 300° C., or even somewhat higher, may be used.

The condensation product is soluble in ethyl alcohol, ether, xylene, carbon tetrachloride and solutions of cellulose derivatives such as nitrocellulose, but is substantially insoluble in petroleum hydrocarbons and fatty oils.

Example 3

To 180 parts by weight of linseed oil are added 25 parts by weight of citraconic anhydride (an alkyl substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an acyclic olefinic acid) are heated under pressure at about 250° C. for about two hours. The condensation product has similar properties to the maleic-linseed oil condensation product obtained in Example 1 as respects solubility above noted, and dispersing power, drying action and adherence to metals, noted below.

Example 5

A mixture of 900 parts by weight of linseed oil and 112 parts by weight of acid methyl maleate (a maleic half ester) are heated under pressure at about 250° C. for about two hours. If neutralized with an alkali, the reaction product forms an excellent dispersing agent as later explained.

My novel condensation product may be made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. When nonconjugated unsaturated nonhydroxylated drying oils are caused to react with maleic anhydride or the like, the products dry in the air at ordinary temperatures to form hard dry films whether or not driers are used. Likewise, the condensation products of nonconjugated unsaturated nonhydroxylated drying oils generally exhibit thermohardening properties, being convertible at 70° C. to 80° C., for example into hard resistant varnish-like films in short periods of time. Where nonconjugated unsaturated nonhydroxylated semidrying oils such as sunflower, soya, safflower, and other similar oils are caused to react with maleic anhydride or the like, the condensation products do not dry so readily as the condensation products obtained from the drying oils. An example of the drying behavior of the condensation product obtained by Example 1 is as follows:—

Example 6

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzine, or xylene.

Without limiting myself to any exact structure for the condensation product, it would appear that the condensation product is an addition product at a double bond in the carbon chain of the nonconjugated unsaturated nonhydroxylated fatty acid or the like to the condensable olefinic compound or the like. For example, if linolenic acid reacts with maleic anhydride, the first stage in the reaction appears to be in general as follows. Of course if enough maleic anhydride be present, the same reaction will take place at each double bond in the linolenic acid.

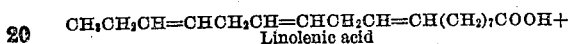
Linolenic acid

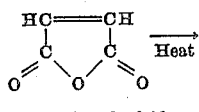
Heat

Maleic anhydride

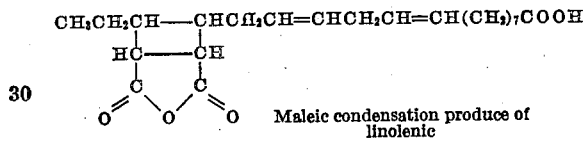
Maleic condensation produce of linolenic

The iodine value of the condensation product confirms the above formula, and indicates that the ethylene linkage of the olefinic compound (in this case maleic anhydride) has been lost during condensation. It should be noted that one of the double bonds in linolenic acid and the ethylene linkage in maleic anhydride appears to have disappeared in the condensation product forming a ring type compound with four carbon atoms in the ring.

The condensation product appears to be characterized by the linkage:—

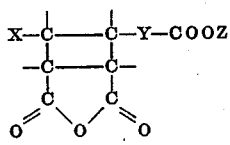

where X and Y are carbon chains without conjugated double bonds and Z is a hydrogen atom, a metal or an ester group.

The reaction above will be modified in well known manner if a glyceryl ester of linolenic acid instead of linolenic acid be used, or if some other nonconjugated unsaturated nonhydroxylated aliphatic acid having between ten and twenty-four carbon atoms in the carbon chain be employed or if some other olefinic acid or acid anhydride or half ester having less than ten carbon atoms in its carbon chain, be used instead of or in mixture with maleic anhydride.

It should be noted that the olefinic acid or acid anhydride condensation product of linolenic acid or any similar acid has a carboxyl group capable of reacting at the end of the linolenic or other similar carbon chain, and also an olefinic acid group capable of reacting. The condensation will take place notwithstanding that both of these groups have been esterified before the condensation reaction, but the presence of the unesterified polar-reactive groups is of great advantage for many purposes as later explained.

When maleic acid or a substance yielding maleic acid is condensed with a nonconjugated unsaturated nonhydroxylated fatty acid or the like, it appears to change to maleic anhydride and the maleic anhydride condensation product results.

*Salts and esters*

As noted above, the acid group of the condensation product is capable of a wide variety of reactions to produce desirable products of various kinds.

A very desirable feature of my invention is the ability to produce dispersing agents for dispersing solids and emulsifying liquids. I have discovered that such a desirable dispersing agent may be obtained by producing a soluble salt, acid salt or salt-ester of the condensation product of maleic anhydride or the like and a nonconjugated unsaturated nonhydroxylated fatty acid or the like having from ten to twenty-four carbon atoms in its carbon chain. For dispersing purposes the soluble salt-ester of the maleic condensation product of a nonconjugated unsaturated nonhydroxylated nondrying fatty oil is preferable.

Experimenting upon the maleic anhydride condensation product of a nonconjugated unsaturated nonhydroxylated fatty oil having from ten to twenty-four carbon atoms in its carbon chain, I have found that the completed salt, in which the maleic grouping is combined with carboxyl groups neutralized by an alkali metal base, for instance potassium or sodium hydroxide, or an organic base such as triethylamine, is a satisfactory dispersing agent. The acid salt, in which one carboxyl group is not neutralized and another is neutralized by an alkali metal base or organic base, is likewise a satisfactory dispersing agent. Also, the salt-ester is satisfactory. The completed ester is not a good dispersing agent.

When reference is made in the claims to a salt in the present connection, it is intended to include completed salts, acid salts and salt-esters. The base used in forming the soluble salt may be an alkali metal base or an organic base.

In producing my desirable dispersing agent, I preferably esterify the maleic condensation product with the theoretical quantity of an aliphatic or aromatic alcohol to produce an acid ester and then neutralize the acid ester with a suitable base or alkali to form a soluble salt-ester. The resultant product is a water-soluble oil which may be mixed with other oils to produce an emulsion. Emulsions made in this way have been found to be very stable and very neutral. Such oil emulsions may be used to advantage instead of sulphonated oil emulsions because the stability, wettability, solubility and dispersive power of the dispersing agent obtained by my invention is greater than in the case of sulphonated oils. Emulsions produced by my dispersing agents have the further advantage over sulphonated oil emulsions that they are not decomposed, and particularly do not liberate an acid group as do the sulphonated oils, which liberate sulphuric acid upon decomposition.

Large quantities of sulphonated oils are now used for dispersing, wetting and softening agents in the textile, leather, paper, plaster and cement industries. My improved product is according to tests by me superior to the commonly used sulphonated oils for use as a dispersing, wetting and softening agent in these and other industries. In the textile field, my product may be used in delustering rayon, for example.

Using my novel dispersing agents, I have produced very satisfactory dispersions of carnauba wax in water, of petroleum hydrocarbons in water and of many vegetable oils, such as linseed, olive, neat's foot, castor, etc., in water.

My new dispersing agent is very desirable as a bodying agent in the making of polishes, cutting fluids and cosmetics. There are of course many other uses too numerous to mention.

EXAMPLE 7

To 50 parts by weight of the viscous oil obtained by the interaction of maleic anhydride and olive oil under conditions similar to those described for instance in Example 1 (1 molecular equivalent of maleic anhydride to 1 molecular equivalent of olive oil), are added 5 parts by weight of isoamyl alcohol and the ingredients are refluxed for one-half hour. Any suitable alcohol may be used for this esterification, although the quantity of alcohol used will of course depend upon the particular alcohol. The reaction produces an acid ester.

The product is neutralized with the theoretical amount of a base, preferably sodium or potassium hydroxide in concentrated aqueous solution. The resultant oily product is miscible with water in all proportions and is likewise miscible in all proportions with fatty oils and petroleum hydrocarbons.

The salt-ester as prepared above may be added to any suitable fatty oil or petroleum hydrocarbon to produce dispersion.

The acid ester may be added to the disperse phase before neutralization, and neutralization may be accomplished in the presence of the disperse phase.

EXAMPLE 8

To a water-insoluble hydrocarbon, alcohol, or fatty oil, such as olive oil, castor oil, etc., or wax such as carnauba or candelilla, the soluble salt-ester of a nonconjugated unsaturated nonhydroxylated fatty oil condensation product as prepared in Example 7 is added until the ester forms 20% of the mixture. This mixture is readily emulsified with water due to the presence of the water-soluble salt-ester, and will remain in suspension over an indefinitely long period of time. Such dispersions having a minimum quantity of dispersing agent have remained in suspension and shown no tendency to cream after a year's standing.

If the water-soluble oil as obtained in Example 8 is boiled with water for one to five hours, the product is not decomposed with the concomitant separation of oil.

The emulsion of olive oil dispersed by the water-soluble oil as obtained in Example 8 is very satisfactory as a wetting and softening agent for the textile, leather, and paper industries.

An ester of the condensation product may be hydrolyzed or partially hydrolyzed and then neutralized to produce a dispersing agent.

The dispersing properties of the soluble salt of the condensation product of the present invention may be very desirably employed in making paints, varnishes and lacquers which are applied in water medium.

EXAMPLE 9

The maleic anhydride condensation product of linseed oil, containing 10% of maleic anhydride with respect to the quantity of oil, and made for instance according to the procedure outlined in Example 1, is treated with sufficient sodium hydroxide to form the sodium acid salt. In other words, one acidic group of the maleic anhydride is neutralized by the alkali, while the other acidic group remains unchanged. This sodium acid salt is then dispersed in water, preferably hot and close to the boiling point. From 10 to 20% of the sodium acid salt may be satisfactorily dispersed.

The water dispersion of the oil is very effective as a dip to apply a "shop coat" to metallic pipe, structural pieces, rolled sections, etc., to prevent corrosion until field painting or to form a base coat for any commercial paint or for one of the paints produced in accordance with the present invention.

The sodium acid salt of the maleic condensation product of linseed oil shows the usual drying properties as already noted and is considerably cheaper than oil vehicle paints.

Any alkali forming a soluble salt, such as sodium, potassium or ammonium hydroxides, or an organic base such as triethylamine may be used. When ammonium hydroxide is employed, it is somewhat volatile and when the ammonia evaporates the film is rendered insoluble in water. Of course the emulsion of the acid ammonium salt cannot be boiled indefinitely without adding ammonia.

Completed salts or salt-esters may be used in place of acid salts in the dispersion of Example 9, but the acid salt is decidedly preferable for metallic coatings. The acid group acts upon the metal which is coated to produce by tenacious adherence to the metal. This specially suits the product of Example 9 as a base or priming coat for metal. The property of adherence to metal is exhibited by the following example.

EXAMPLE 10

Prior to producing the water dispersion of Example 9, using the acid salt of the maleic condensation product of linseed oil, soluble driers are added to the extent of about 0.03% cobalt, 0.05% managanese and 0.5% lead in the form of oxides or other salts which can combine with the acid group. The dispersion is then made up in accordance with Example 9, and one half of a polished zinc plate is dipped in the dispersion, after which the coating is allowed to air-dry for forty-eight hours.

A film adheres very tenaciously to the metallic surface, and, if the film is removed by a solvent, the surface to which the film was attached shows a slight etching effect while the surface of the zinc which was not coated is unaffected. The etching effect appears to be due to the action of the acidic group in the maleic condensation product of linseed oil on the metal.

The property of firm adherence to metal surfaces is exhibited with all of the ordinary structural and coating metals, such as zinc, lead, tin, copper, iron, chromium, cadmium, etc. and their various alloys, such as steel, nichrome, brass, bronze, zinc die-cast metal, etc. A salt of the maleic anhydride condensation product of linseed oil dries much more quickly on copper than linseed oil, probably because the copper salt of the condensation product acts as a drier. Adherence to copper is extremely firm.

An important property of the paint of Examples 9 and 10 is that cellulose ester lacquers adhere very firmly to the dried film of the product of Examples 9 and 10. This is due to the miscibility of nitrocellulose, ethyl cellulose, cellulose acetate, etc., with the oily condensation product. Of course other paints and lacquers besides nitrocellulose may be used for subsequent coats.

The paint of Examples 9 and 10 gives good adherence to wood and leather as well as metal.

Prior to dispersing the salt of the condensation product of an olefinic acid or the like having less than ten carbon atoms in its carbon chain with a nonconjugated unsaturated nonhydroxylated drying oil or the like, resins may be incorporated in the condensation product and dispersed by the condensation product.

EXAMPLE 11

Prior to dispersing the sodium acid salt of the condensation product employed in Example 9, ester gum is dissolved in the condensation product up to about half the limit of solubility. The solution of ester gum in the sodium acid salt of the maleic condensation product of linseed oil is then dispersed in water in accordance with the procedure of Example 10. Other paint, varnish and lacquer resins, for example a phenolic condensation product, may similarly be dissolved in the salt of the condensation product of the present invention and then dispersed.

A very important feature of the paint produced in Examples 9, 10 and 11 is that it has a detergent action, emulsifying and removing from the surface of metals and the like any oils, fats and greases which may be present, and thus insuring free and smooth application of the paint to the metal or other surface coated. This detergent action is so pronounced that in particular instances the salt of the condensation product may be employed purely for its detergent action. In such a case it is preferable to use the salt of the condensation product of a nondrying oil, such as olive oil.

The insoluble salts of the condensation product of the present invention have distinct utility because of their water-resistant properties. The insoluble acid salts of the maleic anhydride condensation product of linseed oil are generally viscous liquids, while the completed salts are of jelly-like or cheesy consistency.

EXAMPLE 12

The calcium acid salt of the linseed oil condensation product of Example 1 is applied as a coating for lining cans and other containers in which foods are shipped. It dries to a water-resistant film of moderate hardness. Xylene may be used as a thinner.

Where food products are not to be encountered the lead, barium and aluminum salts may be dissolved in suitable solvents to form varnishes of very high water resistance.

The properties of the paint of Examples 9 and 10 are particularly desirable because the films are of high hardness and considerable resistance to weathering tests. Pitting and chipping is not serious. Where pigments are incorporated with the paints of Examples 9 to 11, the acidic group present gives good adherence to the pigment which would not be possible otherwise. The degree of permanence of the suspension of pigment is also increased by the emulsifying action of the soluble salt of the condensation product of the present invention. The paints of Examples 9 to 11 also show superior leveling properties. Controlled penetration into wood and similar permeable materials is obtained with the paints of Examples 9 to 11 and separation of the oily material from the pigment, if pigment is used, will be avoided, apparently due to the acidic group of the condensation product.

Very satisfactory oil-soluble driers may be manufactured by causing the condensation product of an acyclic olefinic acid or acid anhydride having less than ten carbon atoms in the carbon chain and a nonconjugated unsaturated nonhydroxylated aliphatic acid or the like having from ten to twenty-four carbon atoms in the carbon chain, particularly a glyceride of such acid, to react with a metallic oxide, hydroxide, carbonate or other similar compound capable of combination with the acid group of the maleic anhydride condensation product. For example, the oxides, hydroxides and carbonates and acetates in the presence of water, and many other salts of lead, cobalt or manganese can be caused to react with the maleic anhydride condensation product of linseed oil prepared as described in Example 1, to form driers which are readily soluble in linseed oil and very useful in the paint, varnish and lacquer industry.

A desirable feature of my invention is that the condensation product of maleic anhydride with nonconjugated unsaturated nonhydroxylated drying oils forms an excellent vehicle or ingredient for a vehicle for paints, etc. This reacts with metallic oxides and hydroxides, and with carbonates and acetates in the presence of water, to form a drier which is chemically combined with the vehicle. Such a drier is made by adding a small percentage of lead oxide to the maleic anhydride condensation product of linseed oil (for example, enough to introduce ½% of lead into the condensation product).

It will be evident of course that the maleic compound having drying properties, such as manganese or cobalt acetate or oxide, or white lead, etc. could be combined with the acidic group before the acidic condensation product is caused to form a salt or an ester.

Salts of the condensation product of the present invention with dye bases produce very desirable colored varnishes and lacquers. The condensation product of maleic anhydride or the like and a drying oil is preferably used, with or without the addition of a synthetic or natural resin in addition to the basic dyestuff. The acidic group of the olefinic acidic condensation product appears to combine with the basic group of the dyestuff. The reaction may be brought about directly or in the presence of a suitable solvent.

EXAMPLE 13

A solution of one part by weight of Victoria blue dye base in ten parts by weight of hot toluene is mixed with 100 parts by weight of the maleic anhydride linseed oil condensation product of Example 1. The blue color of the dye is developed by the acid anhydride group of the condensation product. By the addition of driers, the product may be dried to a transparent colored film.

Some of the basic dyestuffs which may be used for example instead of Victoria blue to produce colored lacquers are:

Red

Magenta
Safranine
Rhodamine
Toluidine red

Violet

Crystal violet
Paraphenylene violet

Blue
Methylene blue
Victoria blue (already mentioned)
Night blue
Paraphenylene blue

Yellow
Leather yellow
Chrysoidine

Green
Malachite green
Brilliant green
Azine green

Brown
Bismark brown

The esters of the condensation product produced in accordance with the present invention have desirable properties. Esterification of the acid group is frequently desirable. The alcohol used may be either aliphatic or aromatic and either mono-, di- or poly-hydric. The esterified condensation product in which the maleic grouping has combined with the grouping of a nonconjugated unsaturated nonhydroxylated fatty drying oil exhibits the same desirable air-drying and thermo-hardening properties as the unesterified condensation product, and may be used for paint, varnish and lacquer work with success.

EXAMPLE 14

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 6, dries at room temperature to a hard film in a somewhat shorter time than that required for linseed oil and, when stoved at 80° C., gives a hard film in about one and one-half hours. The film is not attacked by water, alcohol or xylene.

In the above reaction the ethylene glycol neutralizes the acid anhydride and forms an ester. Of course, if the starting material is the condensation product of linolenic acid instead of the condensation product of its glyceride, esterification takes place at the carboxyl group as well as at the acid anhydride group, as the condensation product is then polar-reactive at two distinct parts of the molecule.

It is possible to manufacture improved varnish or the like by esterifying the condensation product of a nonconjugated unsaturated nonhydroxylated drying oil with an olefinic acid or the like having less than ten carbon atoms in its carbon chain. Glycerine, glycol or other poly-hydric alcohol may be employed in forming the ester. The reaction product should preferably be incorporated with a resin, such as rosin. This mixture may be heated to the required varnish viscosity and then thinned with a common organic solvent.

EXAMPLE 15

Heat together 100 parts by weight of the maleic anhydride condensation product of linseed oil as obtained in Example 1, and 11 parts by weight of glycerine at 230° C. until a drop of the reaction mixture remains clear on cold metal. Then add to the reaction mixture 60 parts by weight of wood rosin and heat at 285° C. for 45 minutes. The product gives an acid number of 25 as compared with 113 for the acid number of the uncondensed mixture.

This product, when cut with petroleum spirits containing drier, dries to a hard, water-resistant film.

At a number of points in the present application it is indicated that the salt or ester is formed by reaction with the base or alcohol after the condensation between an olefinic acid having less than ten carbon atoms in its carbon chain and a nonconjugated unsaturated nonhydroxylated aliphatic acid having from ten to twenty-four carbon atoms in its carbon chain or a nonhydroxylated salt or nonhydroxylated ester thereof. It will, however, be understood that in some cases the order of reaction may be varied without affecting the character of the product, and all such equivalent procedure is intended to be included within the scope of the claims.

It will be evident that the present invention makes it possible to tremendously increase the property of firm adherence to metal and firm adherence to special lacquer films which are to be applied. The present invention also makes possible the production of water dispersions and water-soluble compounds of the condensation product herein discussed.

At some places the nonconjugated unsaturated nonhydroxylated aliphatic acid, nonhydroxylated ester or nonhydroxylated salt having from ten to twenty-four carbon atoms in the carbon chain is referred to as a fatty acid compound or compound having the fatty acid grouping. It will be understood that some variations in desirable reaction temperatures and pressures will be found for different compounds.

Throughout the specification and claims, where I refer to nonconjugated unsaturated nonhydroxylated aliphatic acids having from ten to twenty-four carbon atoms in the carbon chain, or nonhydroxylated salts or nonhydroxylated esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Under the designation poly-hydric alcohols, it is intended to include substituted poly-hydric alcohols such as glycol monoethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. The process of forming a condensation product, which comprises reacting an acyclic olefinic acid having less than ten carbon atoms in the carbon chain of one of the group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C. and continuing the heating until a substantial quantity of the acyclic olefinic acid is combined at an intermediate point in the carbon chain of the one of the group, and subsequently reacting the above reaction product with a substance which combined with the acidic group of the olefinic acid.

2. The process which comprises reacting an acyclic olefinic acid having less than ten carbon atoms in its carbon chain, at the olefinic linkage of one of the group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C. and continuing the heating until a substantial quantity of the acyclic olefinic acid is combined at an intermediate point in the carbon chain of the one of the group and forming a salt from the condensation product.

3. The process of forming a dispersing agent, which comprises reacting an acyclic olefinic acid having less than ten carbon atoms in its carbon chain, with one of the group consisting of nonconjugated unsaturated nonhydroxylated aliphatic acids having from ten to twenty-four carbon atoms in their carbon chains, nonhydroxylated salts and nonhydroxylated esters thereof, the acyclic olefinic acid forming more than 1% by weight of the reaction mixture, at a temperature in excess of 150° C. and continuing the heating until a substantial quantity of the acyclic olefinic acid is combined at an intermediate point in the carbon chain of the one of the group, and converting said condensation product into a soluble salt.

4. The process of forming a water-soluble compound suitable for use as a dispersing agent, which comprises reacting an acyclic olefinic acid having less than ten carbon atoms in the carbon chain with one of the group consisting of nonconjugated unsaturated nonhydroxylated aliphatic acids having from ten to twenty-four carbon atoms in their carbon chains, nonhydroxylated salts and nonhydroxylated esters thereof, at a double bond of the one of the group and at a temperature in excess of 150° C. and continuing the heating until a substantial quantity of the acyclic olefinic acid is combined at an intermediate point in the carbon chain of the one of the group, and forming a soluble salt-ester of the reaction product.

5. The process of forming a water-soluble compound suitable for use as a dispersing agent, which comprises condensing an acyclic olefinic acid having less than ten carbon atoms in the carbon chain with the carbon chain of a nonconjugated unsaturated nonhydroxylated glyceride oil having from ten to twenty-four carbon atoms in the carbon chain of the fatty acid of the oil, at a temperature in excess of 150° C. and continuing the heating until a substantial quantity of the acyclic olefinic acid is combined at an intermediate point in the carbon chain of the fatty acid of the oil and neutralizing at least one acid group in the condensation product with one of the group consisting of alkali metal bases and organic bases.

6. The process of forming a water-soluble compound suitable for use as a dispersing agent, which comprises reacting a compound having the maleic grouping in condensable form and having an acidic group which is or may be neutralized or esterified, at a point of unsaturation in the carbon chain of one of the group consisting of nonconjugated unsaturated nonhydroxylated aliphatic acids having from ten to twenty-four carbon atoms in their carbon chains, nonhydroxylated salts and nonhydroxylated esters thereof at a temperature in excess of 150° C. and continuing the heating until a substantial quantity of the compound having the maleic grouping in condensable form is combined at the point of unsaturation in the carbon chain of the one of the group and forming a water-soluble salt of the reaction product.

7. The process of forming a paint which comprises reacting an acyclic olefinic acid having less than ten carbon atoms in its carbon chain, at the olefinic linkage of one of the group consisting of nonconjugated unsaturated unhydroxylated aliphatic acids having from ten to twenty-four carbon atoms in their carbon chains, nonhydroxylated salts and nonhydroxylated esters thereof at a temperature in excess of 150° C. and continuing the heating until a substantial quantity of the acyclic olefinic acid is combined at an intermediate point in the carbon chain of the one of the group, producing a soluble salt of said condensation product and dispersing the salt in water.

8. The process of forming a paint having the property of adherence to metal, which comprises reacting an acyclic olefinic acid having less than ten carbon atoms in its carbon chain, with a nonconjugated unsaturated nonhydroxylated drying oil having from ten to twenty-four carbon atoms in the carbon chain of the fatty acid of the oil at a temperature in excess of 150° C., and continuing the heating until a substantial quantity of the acyclic olefinic acid is combined at an intermediate point in the carbon chain of the drying oil, forming a water-soluble acid salt of said condensation product and dispersing the same in water.

9. A condensation product of an acyclic olefinic acid having less than ten carbon atoms in the carbon chain at a double bond of one of the group consisting of nonconjugated unsaturated nonhydroxylated aliphatic acids having from ten to twenty-four carbon atoms in their carbon chains, nonhydroxylated salts and nonhydroxylated esters thereof, reacted at a temperature in excess of 150° C. with continuation of the heating until a substantial quantity of the acyclic olefinic acid is combined at an intermediate point in the carbon chain of the one of the group, in which a metal is combined with the olefinic acidic group.

10. In a paint or the like, the condensation product of one of the group consisting of nonconjugated unsaturated nonhydroxylated aliphatic acids having from ten to twenty-four carbon atoms in their carbon chains, nonhydroxylated salts and nonhydroxylated esters thereof, combined at the carbon chain to an acyclic olefinic acid having less than ten carbon atoms in the carbon chain, by reaction at a temperature in excess of 150° C. with continuation of the heating until a substantial quantity of acyclic olefinic acid is combined at an intermediate point in the carbon chain of the one of the group, the acidic grouping being at least in part neutralized by a metallic compound which reacts with the acidic group.

11. A condensation product comprising the reaction product of an acyclic olefinic acid having less than ten carbon atoms in the carbon chain at a double bond in the carbon chain of one of the group consisting of nonconjugated unsaturated nonhydroxylated aliphatic acids with from ten to twenty-four carbon atoms in their carbon chains, nonhydroxylated salts and nonhydroxylated esters thereof, reacted at a temperature in excess of 150° C. with continuation of the heating until a substantial quantity of the acyclic olefinic acid is combined at an intermediate point in the carbon chain of the one of the group, said reaction product containing not more than enough of the olefinic acid to saturate the aliphatic acid, salt or ester and said reaction product being combined with a base.

12. A water-soluble salt formed with one of the group consisting of alkali metal bases and organic bases, reacting at an acidic group with the condensation product of an acyclic olefinic acid having less than ten carbon atoms in its carbon chain, at a point of unsaturation in a nonconjugated unsaturated nonhydroxylated non-drying glyceride oil having from ten to twenty-four carbon atoms in the carbon chain of the fatty acid of the oil, reacted at a temperature in excess of 150° C. with continuance of the reaction until a substantial quantity of the acyclic olefinic acid is combined at an intermediate point in the carbon chain of the fatty acid of the oil.

13. A water-soluble salt formed by the reaction of one of the group consisting of alkali metal bases and organic bases with an acidic condensation product of an acyclic olefinic acid having less than ten carbon atoms in its carbon chain, at a point of unsaturation in the carbon chain of a nonconjugated unsaturated nonhydroxylated glyceride oil having from ten to twenty-four carbon atoms in the carbon chain of the fatty acid of the oil, at a temperature in excess of 150° C. with continuance of the heating until a substantial quantity of the acyclic olefinic acid is combined at the point of unsaturation in the carbon chain of the oil.

14. A water-soluble compound of the acidic condensation product of a nonconjugated unsaturated nonhydroxylated glyceride oil having from ten to twenty-four carbon atoms in the carbon chain of the fatty acid of the oil and a compound having the maleic grouping in condensable form reacted at a temperature in excess of 150° C. with continuance of the reaction until a substantial quantity of the compound having the maleic grouping in condensable form is condensed at an intermediate point in the carbon chain of the fatty acid of the oil, said condensation product being combined with one of the group consisting of alkali metal bases and organic bases.

15. A water-soluble paint ingredient comprising a water-soluble salt of the condensation product of an acyclic olefinic acid having less than ten carbon atoms in its carbon chain, reacted at the olefinic linkage with one of the group consisting of nonconjugated unsaturated nonhydroxylated aliphatic acids having from ten to twenty-four carbon atoms in their carbon chains, nonhydroxylated salts and nonhydroxylated esters thereof, at a temperature in excess of 150° C. with continuation of the heating until a substantial quantity of the acyclic olefinic acid is combined at an intermediate point in the carbon chain of the one of the group.

16. A water-soluble paint comprising a dispersion in water of a water-soluble salt of an acyclic olefinic acid having less than ten carbon atoms in its carbon chain condensed at the olefinic linkage with a nonconjugated unsaturated nonhydroxylated drying oil having from ten to twenty-four carbon atoms in the carbon chain of the fatty acid of the oil, by reaction at a temperature in excess of 150° C. with continuance of the reaction until a substantial quantity of the acyclic olefinic acid is combined at an intermediate point in the carbon chain of the fatty acid of the oil.

17. A water-soluble paint having preferential adherence to metal, comprising a dispersion in water of a water-soluble acid salt of an acyclic olefinic acid having less than ten carbon atoms in its carbon chain condensed at the olefinic linkage with a nonconjugated unsaturated nonhydroxylated drying oil having from ten to twenty-four carbon atoms in the carbon chain of the fatty acid of the oil, by reaction at a temperature in excess of 150° C. with continuance of the reaction until a substantial quantity of the acyclic olefinic acid is combined at an intermediate point in the carbon chain of the fatty acid of the oil.

18. The process of forming a condensation product, which comprises reacting an acyclic olefinic acid having less than ten carbon atoms in the carbon chain with the carbon chain of a nonconjugated unsaturated nonhydroxylated glyceride oil having from ten to twenty-four carbon atoms in the carbon chain of the fatty acid of the oil, at a temperature in excess of the ordinary boiling point of the olefinic acid under return condensation and for a time sufficient to produce a substantial amount of the condensation product and subsequently reacting the above reaction product with a substance which combines with the acidic group of the olefinic acid.

19. The process which comprises forming a condensation product by the reaction of an acyclic olefinic acid having less than ten carbon atoms in the carbon chain at the olefinic linkage with a nonconjugated unsaturated nonhydroxylated glyceride oil having from ten to twenty-four carbon atoms in the carbon chain of the fatty acid of the oil, at a temperature in excess of the ordinary boiling point of the olefinic acid under return condensation and for a time sufficient to produce a substantial amount of the condensation product, and producing a salt of the condensation product.

20. The process of forming a condensation product, which comprises reacting a poly-basic acyclic olefinic acid having less than ten carbon atoms in the carbon chain with the carbon chain of a nonconjugated unsaturated nonhydroxylated glyceride oil having from ten to twenty-four carbon atoms in the carbon chain of the fatty acid of the oil, at a temperature in excess of the ordinary boiling point of the olefinic acid under return condensation and for a time sufficient to produce a substantial amount of the condensation product and reacting one of the acidic groups of the condensation product with a base to form an acid salt.

21. The process of forming a condensation product, which comprises reacting a poly-basic acyclic olefinic acid having less than ten carbon atoms in the carbon chain with the carbon chain of a nonconjugated unsaturated nonhydroxylated glyceride oil having from ten to twenty-four carbon atoms in the carbon chain of the fatty acid of the oil, at a temperature in excess of the ordinary boiling point of the olefinic acid under return condensation and for a time sufficient to produce a substantial amount of the condensation product, reacting one of the acidic groups of the condensation product with a base to form a salt and reacting another acidic group with an alcohol to form an ester, thereby producing a salt ester.

22. The process of forming a condensation product, which comprises reacting maleic acid with the carbon chain of a nonconjugated unsaturated nonhydroxylated glyceride oil having from ten to twenty-four carbon atoms in the carbon chain of the fatty acid of the oil, at a temperature in excess of the ordinary boiling point of the maleic acid under return condensation and for a time sufficient to produce a substantial amount of the condensation product and neutralizing an acidic group to form a salt thereof.

23. A condensation product of an acyclic olefinic acid having less than ten carbon atoms in the carbon chain at a double bond of a nonconjugated unsaturated nonhydroxylated glyceride oil having from ten to twenty-four carbon atoms in the carbon chain of the fatty acid of the oil, reacted at a temperature in excess of the ordinary boiling point of the olefinic acid under return condensation and for a time sufficient to produce a substantial amount of the condensation product, in which a metal is combined with the olefinic acidic group.

24. A water-soluble salt formed with one of the group consisting of alkali metal bases and organic bases, by reacting with the acidic group of a condensation product of an acyclic olefinic acid having less than ten carbon atoms in its carbon chain and olive oil, condensed at a temperature in excess of 150° C. with continuance of the heating until a substantial quantity of the acyclic olefinic acid is combined at an intermediate point in the carbon chain of the olive oil.

25. A water-soluble salt formed with one of the group consisting of alkali metal bases and organic bases, by reacting with the acidic group of a condensation product of an acyclic olefinic acid having less than ten carbon atoms in its carbon chain and olive oil, condensed at a temperature not less than 150° C. and in excess of the normal boiling point of the olefinic acid under return condensation and for a time sufficient to produce a substantial amount of the condensation product.

EDWIN T. CLOCKER.